US007930750B1

(12) United States Patent
Gauvin et al.

(10) Patent No.: US 7,930,750 B1
(45) Date of Patent: Apr. 19, 2011

(54) METHOD TO TRICKLE AND REPAIR RESOURCES SCANNED USING ANTI-VIRUS TECHNOLOGIES ON A SECURITY GATEWAY

(75) Inventors: William Joseph Gauvin, Leominster, MA (US); Edward James Taranto, Boston, MA (US); Steve Y. Zhou, Bedford, MA (US)

(73) Assignee: Symantec Corporation, Mountain View, CA (US)

( * ) Notice: Subject to any disclaimer, the term of this patent is extended or adjusted under 35 U.S.C. 154(b) by 1033 days.

(21) Appl. No.: 11/738,220

(22) Filed: Apr. 20, 2007

(51) Int. Cl.
*G06F 11/00* (2006.01)
(52) U.S. Cl. ........... 726/24; 726/13; 726/14; 726/22; 726/23; 726/25; 709/223; 709/227
(58) Field of Classification Search .......... 726/13, 726/14, 22–25; 709/223, 227
See application file for complete search history.

(56) References Cited

U.S. PATENT DOCUMENTS

2003/0191957 A1* 10/2003 Hypponen et al. ............ 713/200
2005/0097358 A1* 5/2005 Yanovsky ..................... 713/201
2006/0224724 A1* 10/2006 Marinescu et al. ........... 709/224
2007/0113284 A1* 5/2007 O'Rourke et al. ............ 726/23

OTHER PUBLICATIONS

Zorp, "Virus Filtering in HTTP", httpP://www.balabit.hu/dl/white_papers/zorp-gateway-v3.1-whitepaper-zcv.en-pdf., Aug. 2006. pp. 1-10.*

* cited by examiner

*Primary Examiner* — Vivek Srivastava
*Assistant Examiner* — Hee Song
(74) *Attorney, Agent, or Firm* — Gunnison, McKay & Hodgson, L.L.P.; Philip McKay

(57) ABSTRACT

In one embodiment, a trickle and repair application receives data from a sending computer system and trickles the data to a target computer system over an in-band communication channel. The received data is evaluated for the presence of malicious code. When malicious code is detected in the data, trickling of the data is terminated. If the infected data is repairable, the data is repaired and an out-of-band target data notification is generated and sent to the target computer system. In one embodiment, receipt of the out-of-band target data notification causes the target computer system to flush the current buffer and any local files containing the trickled data. The target computer system returns an out-of-band target acknowledgement to the trickle and repair application and the repaired data is sent to the target computer system.

20 Claims, 6 Drawing Sheets

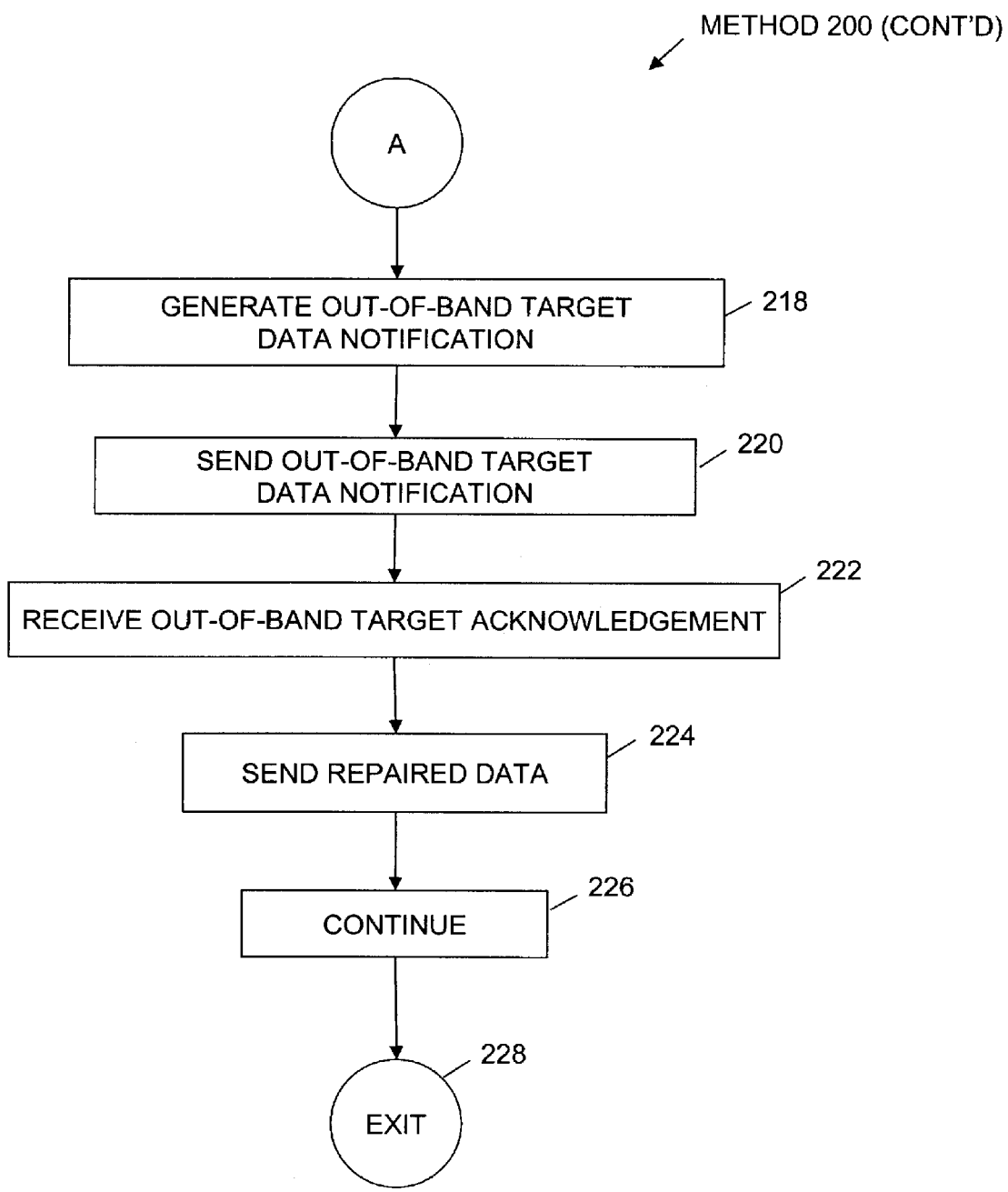

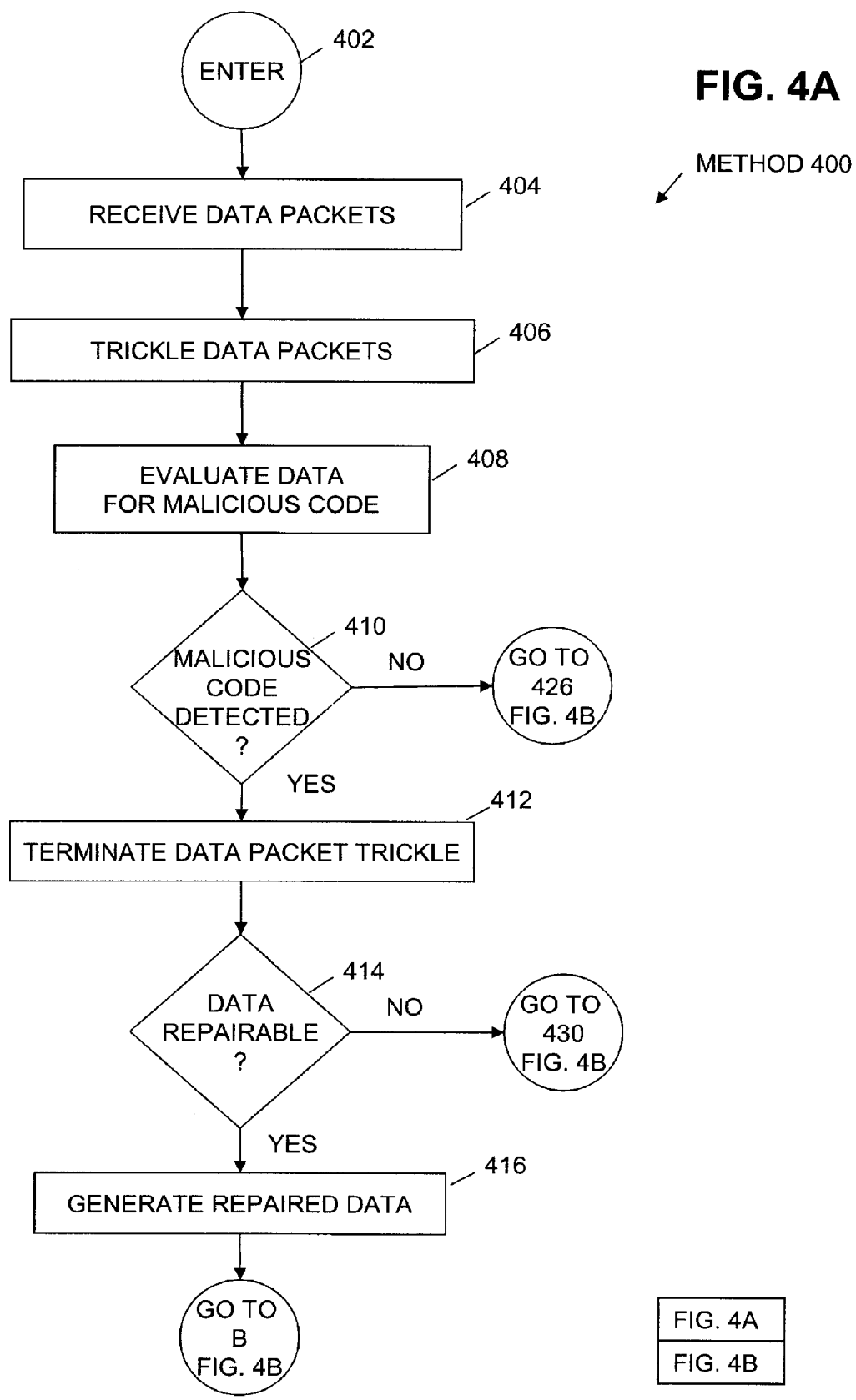

US 7,930,750 B1

METHOD TO TRICKLE AND REPAIR RESOURCES SCANNED USING ANTI-VIRUS TECHNOLOGIES ON A SECURITY GATEWAY

BACKGROUND OF THE INVENTION

1. Field of the Invention

The present invention relates to computer systems. More particularly, the present invention relates to computer security.

2. Description of Related Art

A security gateway, such as a firewall, is often placed in the communication path between a private protected network and an untrusted network, such as the Internet, to provide data scanning services for the detection of viruses and other malicious code attempting to enter the protected network. Many of these security gateways require the receipt of the entire resource, such as the data of an entire executable file being downloaded, before the security gateway begins scanning the data of the resource for malicious code.

As the vast majority of normal Internet downloads are free of malicious code, holding the entire data of the resource at a security gateway causes unnecessary delay and may cause the communication channel to close because of inactivity timeouts. Consequently, some other security gateways forward the data of the resource to the intended destination before the security gateway has even scanned the data. This process of forwarding data of a resource to the destination before the data has been scanned by the security gateway is commonly termed "trickling".

While trickling of data to a destination is sometimes necessary or even desirable, trickling creates problems when the data is found to contain malicious coed, i.e., is infected. With trickling, once the security gateway has discovered the data is infected, most of the malicious code has been transferred to the destination, so that currently the only recourse is for the security gateway to abnormally terminate the connection, and assume that the application receiving the data will delete the partially received data. Also with trickling, it is currently not possible to deliver a repaired version of the data since part of the infected data has already been delivered.

SUMMARY OF THE INVENTION

In accordance with one embodiment of the invention, a method includes: receiving data sent from a sending computer system for delivery to a target computer system; trickling at least a portion of the data to the target computer system over an in-band communication channel; determining whether the data contains malicious code; upon a determination that the data contains malicious code, terminating the trickling; determining whether the data is repairable; upon a determination that the data is repairable, generating repaired data; generating an out-of-band target data notification, the out-of-band target data notification causing the target computer system to remove said at least a portion of said data from the target computer system; sending the out-of-band target data notification to the target computer system over an out-of-band communication channel; receiving an out-of-band target acknowledgment from the target computer system; and sending the repaired data to the target computer system.

In some embodiments, the repaired data is sent to the target computer system over the in-band communication channel over which the infected data was originally received. In other embodiments, such as when a connectionless communication protocol is being used and the amount of repaired data is small, the repaired data is sent to the target computer system over the out-of-band channel. In some embodiments, the repaired data is also sent to the sending computer system.

Embodiments in accordance with the invention permit trickling of data to a target computer system, and when malicious code is detected in the data, to generate repaired data and complete the data transfer with the repaired data. In some embodiments in accordance with the invention, the method is implemented as a trickle and repair terminating security gateway system. In other embodiments in accordance with the invention, the method is implemented as a trickle and repair non-terminating security gateway system.

Embodiments described herein are best understood by reference to the following detailed description when read in conjunction with the accompanying drawings.

BRIEF DESCRIPTION OF THE DRAWINGS

FIGS. 2A and 2B illustrate a flow diagram of a method for trickle and repair of a resource scanned using anti-virus (AV) technologies in accordance with one embodiment of the invention.

FIGS. 4A and 4B illustrate a flow diagram of a method for trickle and repair of a resource scanned using anti-virus (AV) technologies in accordance with another embodiment of the invention.

Common reference numerals are used throughout the drawings and detailed description to indicate like elements.

DETAILED DESCRIPTION

Figure 1:
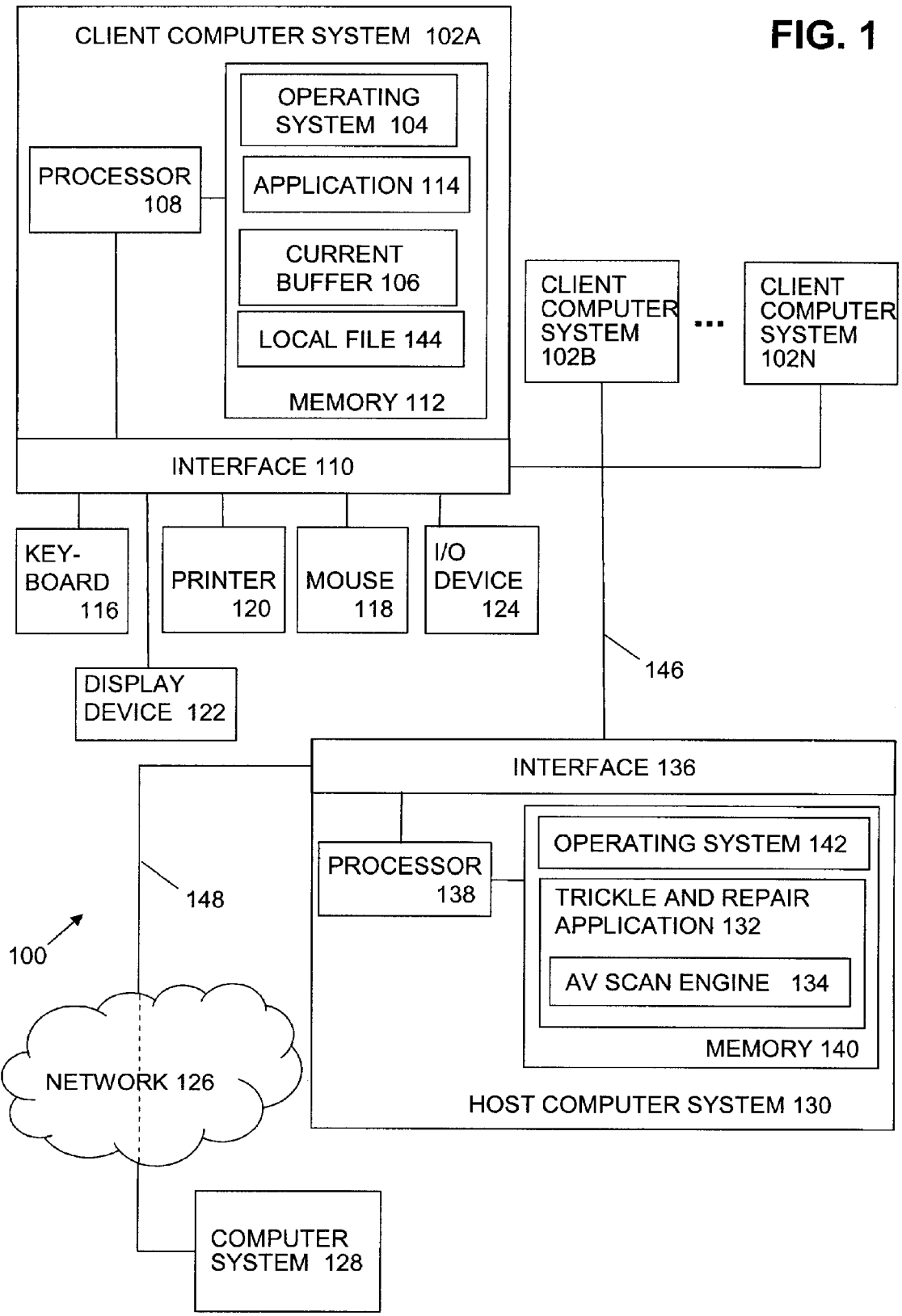
FIG. 1 is a diagram of a computer system that includes a trickle and repair application executing on a host computer system in accordance with one embodiment of the invention.

As earlier described, a security gateway is typically positioned in a communication path between a protected network and an untrusted network. For purposes of discussion, the communication path can be viewed as being between a target application on a target computer system within the protected network and a sending application on a sending computer system in the untrusted network. As a security gateway is typically put in place to protect the computer system(s) in the protected network, the security gateway typically functions to analyze data sent over the communication channel from the sending computer system in the untrusted network to the target computer system in the protected network, and to prevent malicious code from entering into the protected network.

Security gateways are typically implemented in a communication path as either a terminating security gateway or a non-terminating security gateway. Generally viewed, a terminating security gateway acts as an application level endpoint between the sending computer system and the target computer system. Thus, for example, a first communication sub-path is established between the sending computer system and terminating security gateway, and a second communication sub-path is established between the terminating security gateway and the target computer system. The data received from the sending computer system for delivery to the target computer system is received by the terminating security gateway over the first communication sub-path and then the terminating security gateway sends the data to the target computer system over the second communication sub-path. Consequently, a terminating security gateway has the opportunity to evaluate and/or modify the data received from the sending computer system before the data is sent to the target computer system.

Differently, a non-terminating security gateway does not act as an endpoint between the sending computer system and the target computer system, but instead a non-terminating security gateway acts as an in-line proxy at the transport level. The data sent by the sending computer system simply passes through the non-terminating security gateway to the target computer system. For example, in a communication path established between a sending computer system and a target computer system, the data stream passes through the non-terminating security gateway on to the target computer system. Transmission of data by conventional terminating security gateways and conventional non-terminating security gateways is well-known to those of skill in the art and is not further described herein in detail to avoid detracting from the principles of the invention.

Data is conventionally communicated over the communication path in accordance with a particular communication protocol. Connection-oriented protocols, such as the Transmission Control Protocol (TCP), utilize logical connections. Differently, connectionless protocols, such as the User Datagram Protocol (UDP), do not establish logical connections. Conventional communication protocols, such as TCP and UDP, are well-known to those of skill in the art and are not further described herein in detail to avoid detracting from the principles of the invention.

Standard communication of the data of a resource in accordance with a protocol occurs over the standard in-band communication channel, e.g., the main channel. However, most communication protocols also provide for communication of other data, such control data or exception data, commonly called out-of-band data. In some protocols, the out-of-band data appears to the receiver as being communicated over a separate logical communication channel, herein termed the out-of-band communication channel. For example, in TCP, out-of-band data is commonly called "urgent data" and appears to the target application as being communicated on a separate logical communication channel, i.e., the out-of-band communication channel, different from the in-band communication channel.

In other protocols, out-of-band data may not be provided for and/or out-of-band data does not appear to a receiver as being communicated over a separate logical communication channel. For example, UDP does not provide for out-of-band data or a logically separate out-of-band communication channel, but UDP datagrams including out-of-band control commands can be utilized to send control data to a target application.

Thus, herein the term out-of-band communication channel refers to the communication of out-of-band data whether or not a specific communication protocol provides for or recognizes a separate out-of-band communication channel.

Embodiments in accordance with the invention provide a method to trickle data to a target computer system and when malicious code is detected in the data and repaired data generated, to complete the data transfer with the repaired data. In some embodiments, optionally, the repaired data is also communicated to a sending computer system.

Figure 2A:
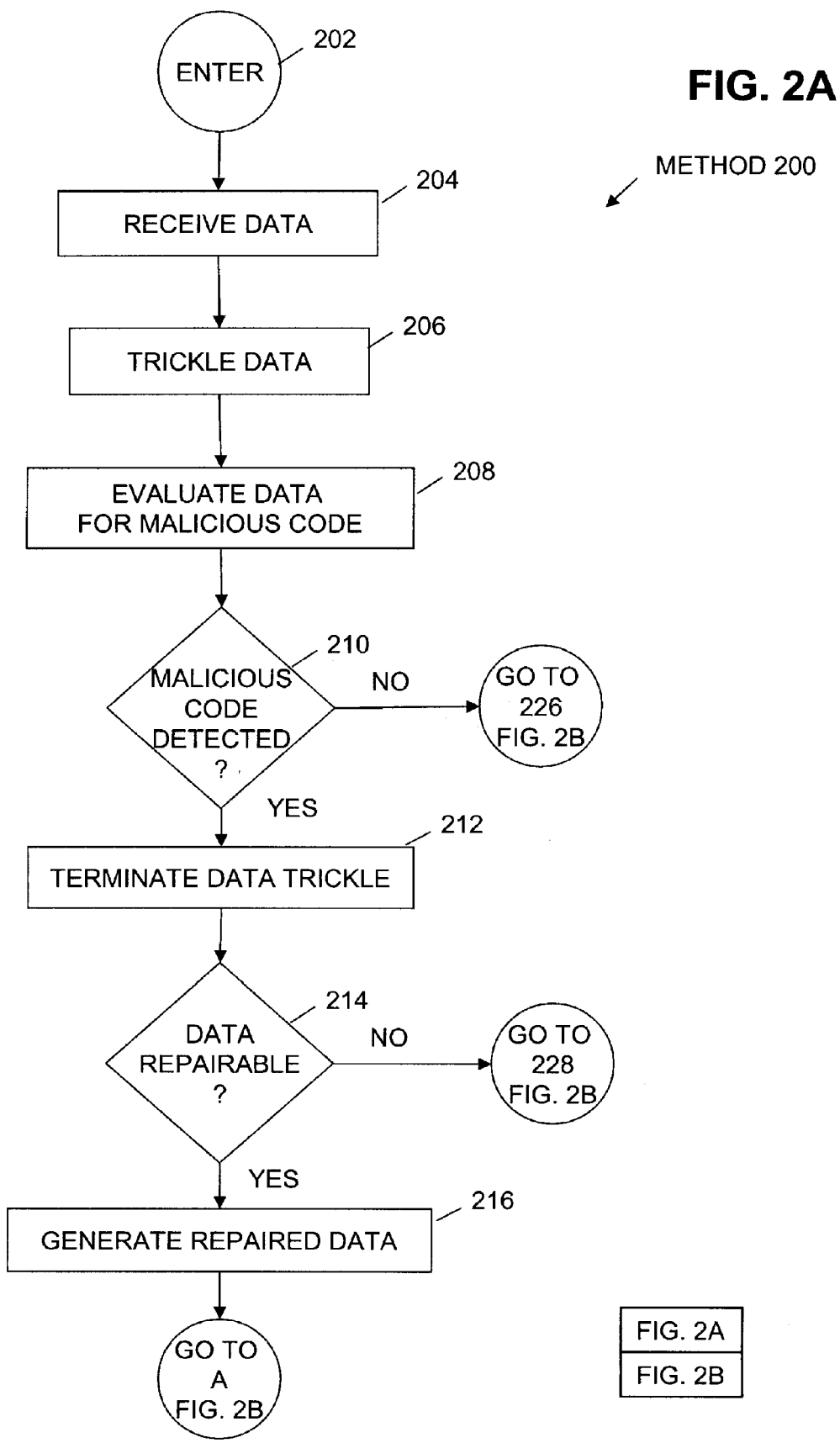
Figure 3:
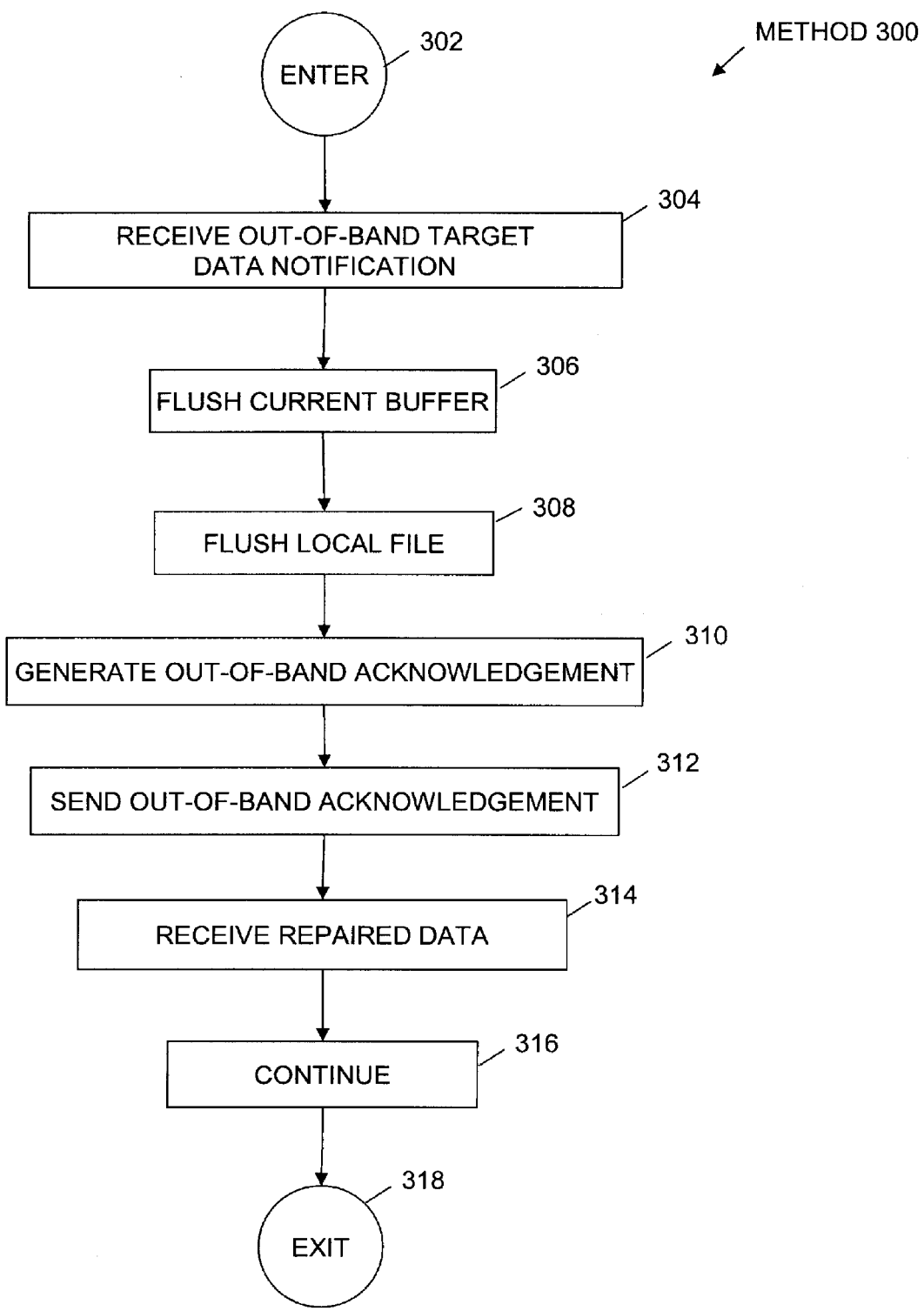
FIG. 3 illustrates a flow diagram of a method implemented on a target computer system in response to receipt of an out-of-band target data notification in accordance with one embodiment of the invention.

Referring generally to FIGS. 2A, 2B, and 3, in one embodiment, trickle and repair application 132 (FIG. 1) is implemented as a trickle and repair terminating security gateway system and receives data from a sending computer system (operations 202, 204) and trickles at least a portion of the data to a target computer system (operation 206). The data is evaluated, for example, by an anti-virus (AV) scan engine, for malicious code (operation 208), and when malicious code is detected in the data (operation 210, "YES"), the data trickle is terminated (operation 212) and a determination is made whether the data is repairable (operation 214). When the data is repairable ("YES"), repaired data is generated (operation 216) in which the malicious code is removed or otherwise inactivated. An out-of-band target data notification is generated (operation 218) and sent to the target computer system (operation 220). The target computer system receives the out-of-band target data notification (operation 304), and in response, flushes the trickled data from an associated current buffer (operation 306) and from an associated local file (operation 308), and returns an out-of-band target acknowledgment (operations 310, 312).

On receipt of the out-of-band target acknowledgment (operation 222), the repaired data is sent to the target computer system (operation 224), and received by the target computer system (operation 314).

Figure 4B:
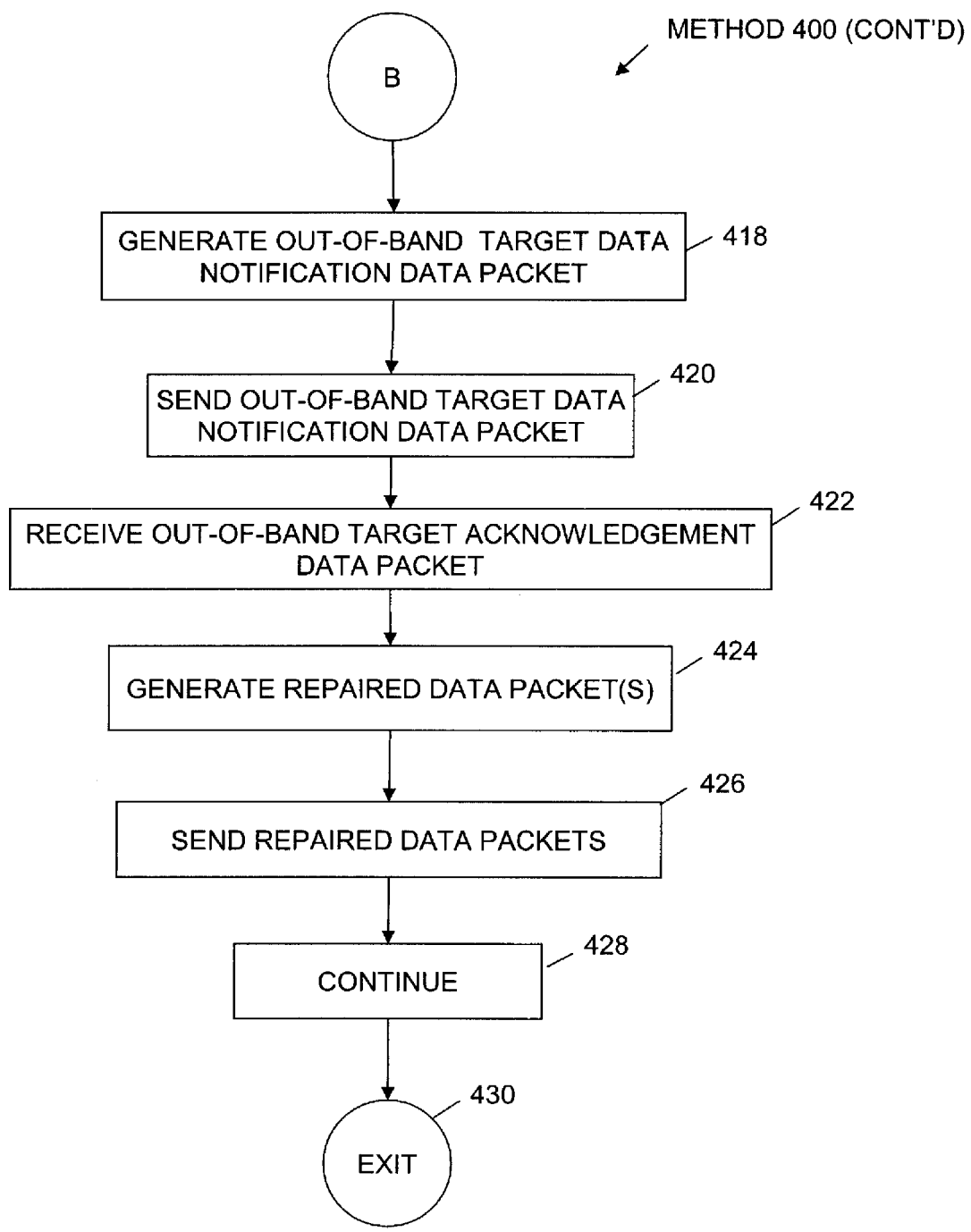

In another embodiment, referring generally to FIGS. 4A and 4B, in one embodiment, trickle and repair application 132 (FIG. 1) is implemented as a trickle and repair non-terminating security gateway and receives data as data packets including data from a sending computer system (operations 402, 404) and trickles at least a portion of the data packets to a target computer system (operation 406). The data is evaluated, for example, by an anti-virus (AV) scan engine, for malicious code (operation 408), and when malicious code is detected in the data (operation 410, "YES"), the data packet trickle is terminated (operation 412) and a determination is made whether the data is repairable (operation 414). When the data is repairable ("YES"), repaired data is generated (operation 416) in which the malicious code is removed or otherwise inactivated. An out-of-band target data notification data packet including an out-of-band target data notification is generated (operation 418) and sent to the target computer system (operation 420) by inserting the out-of-band target data notification data packet into the data stream being trickled to the target computer system. The target computer system receives the out-of-band target data notification data packet and processes the out-of-band target data notification as generally described with to FIG. 3 with an out-of-band target acknowledgment being generated and returned as a data packet in the data stream.

The out-of-band target acknowledgment data packet is captured from the data stream, and the out-of-band target acknowledgment received (operation 422). The repaired data is written into data packets (operation 424) and the repaired data sent to the target computer system (operation 426).

Referring now, more particularly, to FIG. 1, FIG. 1 is a diagram of a computer system 100 that includes trickle and repair application 132 executing on a host computer system 130, such as a server computer system, network router, or other host system, in accordance with one embodiment of the invention. In one embodiment, host computer system 130 interfaces between client computer system 102A-102N on network 146, and computer systems outside network 146, such as a computer system 128 on the Internet 126. Thus, for purposes of discussion client computer systems 102A-102N and network 146 can be viewed as belonging to a private protected network, and Internet 126 and computer system 128 as belonging to an untrusted network.

In one embodiment, trickle and repair application 132 is implemented on host computer system 130 as a terminating security gateway, and thus in this embodiment, host computer system 130 including trickle and repair application 132 is a trickle and repair terminating security gateway system. In another embodiment, trickle and repair application 132 is implemented as a non-terminating security gateway, and thus in this other embodiment, host computer system 130 including trickle and repair application 132 is a trickle and repair non-terminating security gateway system.

In FIG. 1, host computer system 130 is connected to Internet 126 via communication path 148, and connected to client computer systems 102A-102N via network 146. Host computer system 130 includes, but is not limited to: a processor, e.g., processor 138; an operating system, e.g., operating system 142; one or more memories, e.g., memory 140; input/output interfaces, including network interfaces, e.g., interface 136.

Host computer system 130 may further include input/output devices, such as a display, a keyboard, a mouse, a floppy disc drive, and a CD-ROM drive or other digital or waveform port for inputting data to and outputting data from host computer system 130 (not shown). Host computer system 130 further includes one or more buffers (not shown) and network stacks (not shown) for receiving and sending data.

In one embodiment, trickle and repair application 132 is loaded into host computer system 130 via an I/O device, such as from a CD, DVD or floppy disk (not shown), containing trickle and repair application 132, or via a port, such as via a transfer from another computer system. In one embodiment, trickle and repair application 132 includes, or has access to, an AV scan engine 134 that scans or otherwise evaluates data for malicious code. Herein, in one embodiment, malicious code is defined as any computer program, module, set of modules, or code that enters a computer system environment without an authorized user's knowledge and/or without an authorized user's consent. A computer virus is one example of a malicious code. Trickle and repair application 132 and AV scan engine 134 are stored in a memory, e.g., memory 140, of host computer system 130 and executed by a processor, e.g., processor 138, of host computer system 130.

Client computer system 102A, sometimes called a user device, typically includes a central processing unit (CPU) 108, hereinafter processor 108, an interface 110, and a memory 112. In one embodiment, memory 112 includes an operating system 104.

In one embodiment, client computer system 102A includes an application 114 for processing received data, e.g., data trickled from trickle and repair application 132, a current buffer 106 for receiving data, e.g., trickled data, a local file 144 in which the trickled data is stored.

Client computer system 102A may further include standard devices such as a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from client computer system 102A. In FIG. 1, client computer system 102A is coupled to host computer system 130 by network 146.

Network 146 can further include other computer systems, such as client computer systems 102B-102N that are also coupled to host computer system 130 by network 146. The various hardware components of client computer systems 102B-102N are not illustrated to avoid detracting from the principles of the invention.

Herein, for purposes of clarity, the description of the present invention with reference to client computer systems 102A-102N is described with reference to client computer system 102A. It can be understood, however, that the description with reference to client computer system 102A is applicable to client computer systems 102B-102N as well.

In one embodiment, computer system 128 is a computer system that can be utilized by an attacker to attempt to communicate data including malicious code to client computer system 102A. Computer system 128 can be similar to client computer system 102A and, for example, can include a central processing unit, an input output (I/O) interface, and a memory. Computer system 128 may further include standard devices like a keyboard, a mouse, a printer, a display device and an I/O device(s). The various hardware components of computer system 128 are not illustrated to avoid detracting from the principles of the invention.

In various embodiments, interfaces of host computer system 130, e.g., interface 136, and client computer system 102A, e.g., interface 110, include network interfaces, such as analog modems, digital modems, or a network interface card, as well as any other interfaces required for input to and output from host computer system 130 and client computer system 102A. Further, network 146 and Internet 126 are any network or network system that is of interest to a user.

Herein the particular type, and configuration of client computer systems 102A-102N, host computer system 130, and computer system 128 are not essential to the present invention. Further, although examples of the present invention are described herein with reference to particular communication protocols, those of skill in the art can apply the principles and operations described herein to other communication protocols with modifications as needed by a specific communication protocol.

FIGS. 2A and 2B illustrate a flow diagram of a method 200 for trickle and repair of a resource scanned using anti-virus (AV) technologies in accordance with one embodiment of the invention. Referring now to FIGS. 1, 2A and 2B together, in one embodiment, trickle and repair application 132 is implemented on host computer system 130 as a terminating security gateway between a sending computer system, represented herein by computer system 128 for purposes of description, and a target computer system, represented herein by client computer system 102A for purposes of description. Thus in this embodiment, host computer system 130 including trickle and repair application 132 represents a trickle and repair terminating security gateway system.

In one embodiment, execution of trickle and repair application 132 by processor 138 results in the operations of method 200 as described below. In one embodiment, method 200 is entered at an ENTER operation 202, and from ENTER operation 202, processing transitions to RECEIVE DATA operation 204.

In RECEIVE DATA operation 204, trickle and repair application 132 receives data of a resource from a sending computer system identified for delivery to a target computer system. For example, in one embodiment, trickle and repair application 132 receives data, such as a portion of data from a file, e.g., a resource, sent from computer system 128 for delivery to client computer system 102A.

In one embodiment, trickle and repair application 132 includes or has access to one or more buffers for receiving the data and for controlling the trickling of the data to client computer system 102A. From RECEIVE DATA operation 204, processing transitions to a TRICKLE DATA operation 206.

In TRICKLE DATA operation 206, at least a portion of the data received in operation 204 is trickled, i.e., communicated, to the target computer system. More particularly, trickle and repair application 132 permits at least a portion of the data received in operation 204 to be communicated over an in-band communication channel to client computer system 102A over network 146.

Client computer system 102A, for example, application 114 of client computer system 102A, receives the trickled data into a current buffer, e.g., current buffer 106, and establishes a local file, e.g., local file 144 identified by a file name, for example, file.txt, into which the trickled data is stored. From TRICKLE DATA operation 206, processing transitions to an EVALUATE DATA FOR MALICIOUS CODE operation 208.

In EVALUATE DATA FOR MALICIOUS CODE operation 208, the data received in operation 204 is scanned or otherwise evaluated to determine whether malicious code is detected. As earlier described, AV scan engine 134 can be any one or a combination of a variety of different scanning or evaluation applications or algorithms used for detecting malicious code. The particular method used to obtain the data for scanning and evaluation of the data varies dependent on the particular AV scan engine 134 selected. For example, in one embodiment, a copy of the data received in operation 204 is evaluated by AV scan engine 134 for the presence of malicious code. AV scan engines are well known to those of skill in the art and are not further described herein in detail to avoid detracting from the principles of the invention. In some embodiments, AV scan engine 134 also includes malicious code repair methods. From EVALUATE DATA FOR MALICIOUS CODE operation 208, processing transitions to a MALICIOUS CODE DETECTED check operation 210.

In MALICIOUS CODE DETECTED check operation 210, a determination is made whether malicious code is detected in operation 208. For example, in one embodiment, when malicious code is not detected in the data based on operation 208 ("NO"), from MALICIOUS CODE DETECTED check operation 210, processing transitions to a CONTINUE operation 226.

In CONTINUE operation 226, standard communication transmission continues until the transmission is complete or otherwise terminated. From CONTINUE operation 226, processing transitions to an EXIT operation 228 with processing exiting method 200.

Referring back again to MALICIOUS CODE DETECTED check operation 210, alternatively, when malicious code is detected in the data based on operation 208, i.e., the data is infected data, ("YES"), from MALICIOUS CODE DETECTED check operation 210, processing transitions to a TERMINATE DATA TRICKLE operation 212.

In TERMINATE DATA TRICKLE operation 212, the trickle of data to the target computer system is terminated. For example, the trickle of data to client computer system 102A is terminated. From TERMINATE DATA TRICKLE operation 212, processing transitions to a DATA REPAIRABLE check operation 214.

In DATA REPAIRABLE check operation 214, a determination is made whether the data is repairable.

More particularly, a determination is made whether the malicious code detected in operation 208 can be removed, or otherwise inactivated, so as not to present a risk to the target computer system.

For example, in one embodiment, trickle and repair application 132 includes or has access to a malicious code repair function. In some embodiments, the malicious code repair function is part of AV scan engine 134. The malicious code repair function may further include or have access to malicious code repair algorithms and/or databases which are utilized to evaluate and repair infected data. In one embodiment, if an effective malicious code repair method is available to repair the infected data, the infected data is determined to be repairable, otherwise the infected data is determined not to be repairable.

When a determination is made that the data is not repairable, i.e., the malicious code cannot be removed or inactivated ("NO"), from DATA REPAIRABLE check operation 214, processing transitions to EXIT operation 228 with the transmission terminating and processing exiting method 200. In some embodiments, optionally, prior to the transmission terminating, a notification is generated alerting a user of the target computer system that malicious code is detected.

Referring back again to DATA REPAIRABLE check operation 214, alternatively, when a determination is made that the data is repairable, i.e., the malicious code can be removed or otherwise inactivated ("YES"), from DATA REPAIRABLE check operation 214, processing transitions to a GENERATE REPAIRED DATA operation 216.

In GENERATE REPAIRED DATA operation 216, the data is repaired, i.e., modified, so that the malicious code detected in operation 208 is removed from the data, or otherwise inactivated, so as not to present a risk to the target computer system. The resultant modified data is termed herein repaired data. From GENERATE REPAIRED DATA operation 216, processing transitions to a GENERATE OUT-OF-BAND TARGET DATA NOTIFICATION operation 218.

In GENERATE OUT-OF-BAND TARGET DATA NOTIFICATION operation 218, trickle and repair application 132 generates an out-of-band target data notification for sending to the target computer system. In one embodiment, the out-of-band target data notification signals the target computer system, e.g., client computer system 102A, that malicious code, such as a virus, is detected, and repaired data is to be sent.

In one embodiment, the out-of band target data notification signals the target computer system to purge the current buffer and associated local file of any received data, so that the entire file including the repaired data portion, herein termed the repaired file, can be sent. In some embodiments, in which a protocol that supports file location is utilized, such as Common Internet File System (CIFS) protocol, Hypertext Transfer Protocol (HTTP) and Network File System (NFS) protocol, the out-of-band target data notification identifies a portion of the file containing the malicious code to be deleted from the associated current buffer and the associated local file. In this way, the associated local file is reset to receive the portion of the file including the repaired data, herein termed the repaired file portion, rather than the entire repaired file including the repaired data. From GENERATE OUT-OF-BAND TARGET DATA NOTIFICATION operation 218, processing transitions to a SEND OUT-OF-BAND TARGET DATA NOTIFICATION operation 220.

In SEND OUT-OF-BAND TARGET DATA NOTIFICATION operation 220, the out-of-band target data notification is sent to the target computer system. For example, in one embodiment, the out-of-band target data notification is sent from trickle and repair application 132 on host computer system 130 to client computer system 102A over network 146.

In some embodiments, the out-of-band target data notification is passed to an exception handler which sends the out-of-band target data notification to the client computer system 102A. Thus, in the present embodiment, the out-of-band target data notification is received by client computer system 102A over an out-of-band communication channel rather than the in-band communication channel over which the infected data was originally trickled in operation 206.

Client computer system 102A receives the out-of-band target data notification, and in response, flushes the data in the associated current buffer, e.g., current buffer 106 (FIG. 1) and flushes the data in the associated local file, e.g., local file 144

(FIG. 1). In this way trickled data containing the malicious code, i.e., infected data, is removed from the standard data transmission communication channel and from any current buffer and local file (or memory location) holding the infected data to client computer system 102A.

As earlier described, in some embodiments, client computer system 102A receives the out-of band target data notification, and in response, flushes an identified portion of current buffer 106 and local file 144. In this way a portion of trickled data containing the malicious code is removed from client system 102A, and local file 144 is reset to receive the portion of the file including repaired data.

When complete, client system 102A generates and returns an out-of-band target acknowledgement over the out-of-band communication channel indicating readiness for receipt of the repaired data. Processing of an out-of-band target data notification by client computer system 102A is further described later herein with reference to FIG. 3 and a method 300. From SEND OUT-OF-BAND TARGET DATA NOTIFICATION operation 220, processing transitions to a RECEIVE OUT-OF-BAND TARGET ACKNOWLEDGEMENT operation 222 upon receipt of an out-of-band target acknowledgment.

In RECEIVE OUT-OF-BAND TARGET ACKNOWLEDGEMENT operation 222, trickle and repair application 132 receives an out-of-band target acknowledgement sent by the target computer system, e.g., client computer system 102A. The out-of-band target acknowledgment signals trickle and repair application 132 that the target computer system, e.g., client computer system 102A, is ready to receive the repaired data. From RECEIVE OUT-OF-BAND TARGET ACKNOWLEDGEMENT operation 222, processing transitions to a SEND REPAIRED DATA operation 224.

In SEND REPAIRED DATA operation 224, the repaired data generated in operation 216 is sent to the target computer system, e.g., client system 102A. In one embodiment, the repaired data is sent to client system 102A on the in-band communication channel over which the infected data was initially trickled in operation 206. This embodiment can be utilized with both connection-oriented protocols, such as TCP, and connectionless protocols, such as UDP. In some embodiments, the entire file including the repaired data, herein termed the repaired file, is sent. In some embodiments, in which protocols that support file location, such as the Common Internet File System (CIFS) protocol, the Hypertext Transfer Protocol (HTTP) and the Network File System (NFS) protocol, are used, a portion of the file including the repaired data, herein termed the repaired file portion, is sent using the facilities available within the particular protocol that allow the identification of the portion of the file to be repaired.

As an alternative to sending the repaired data as an in-band communication, in some instances the repaired data is sent as an out-of-band communication. For example, in one alternate embodiment, where a connectionless protocol, such as UDP, is being utilized for communication and the repaired data is contained in a single packet, the repaired data is sent as out-of-band data over the out-of-band communication channel to client computer system 102A. In another alternate embodiment, where a high-level application protocol, such as a data streaming protocol, which guarantees data delivery and ordering, or other methods available within the protocol to handle lost packets, the repaired data is sent as out-of-band data over the out-of-band communication channel to client computer system 102A. From SEND REPAIRED DATA operation 224, processing transitions to CONTINUE operation 226, earlier described, with processing then exiting method 200 at EXIT operation 228.

FIG. 3 illustrates a flow diagram of a method 300 implemented on a target computer system in response to receipt of an out-of-band target data notification in accordance with one embodiment of the invention. As earlier described with reference to FIGS. 2A and 2B and method 200, the target computer system, e.g., client system 102A, is receiving data trickled from trickle and repair application 132 on host computer system 130 (operation 206, FIG. 2A). For example, client computer system 102A is receiving data trickled from trickle and repair application 132 on host computer system 130, buffering the trickled data to an associated buffer, e.g., current buffer 106 (FIG. 1), and storing the buffered data to an associated local file (or memory location), e.g., local file 144 (FIG. 1).

Referring now to FIGS. 1, 2A, 2B, and 3 together, in one embodiment, the out-of-band target data notification is received on client computer system 102A, for example, by application 114. Execution of the out-of-band target data notification by processor 108 results in the operations of out-of-band target data notification method 300 as described below. In one embodiment, method 300 is entered at an ENTER operation 302, and from ENTER operation 302, processing transitions to RECEIVE OUT-OF-BAND TARGET DATA NOTIFICATION operation 304.

In RECEIVE OUT-OF-BAND TARGET DATA NOTIFICATION operation 304, the out-of-band target data notification sent in operation 220 of method 200 (FIG. 2B) is received by the target computer system, e.g., client computer system 102A. Generally viewed, receipt of the out-of-band target data notification indicates to client computer system 102A that malicious code is detected, and that the data currently being buffered to a current buffer and stored to a local file (or memory) is no longer valid and that the current buffer together with the local file (or memory) needs to be flushed in preparation for receipt of repaired data.

There are a variety of different ways client computer system 102A can receive and process the out-of-band target data notification. For example, a LINUX-based target computer system can receive the out-of-band target data notification and process the out-of-band target data notification as an exception, whereas a Windows-based target computer system can post a read on the out-of-band target data notification. From RECEIVE OUT-OF-BAND TARGET DATA NOTIFICATION operation 304, processing transitions to a FLUSH CURRENT BUFFER operation 306.

In FLUSH CURRENT BUFFER operation 306, the target computer system, e.g., client system 102A, flushes the current buffer, e.g., current buffer 106 (FIG. 1), receiving the trickled data. In this way the infected data is removed from the current buffer of client computer system 102A. From FLUSH CURRENT BUFFER operation 306, processing transitions to a FLUSH LOCAL FILE operation 308.

In FLUSH LOCAL FILE operation 308, the target computer system, e.g., client system 102A, flushes data stored in the associated local file, e.g., local file 144 (FIG. 1). Local file 144 retains the same file name, but the contents are null and void, e.g., empty. In this way the infected data is removed from the local file of client computer system 102A.

As earlier described, in some embodiments continuing the earlier example, client computer system 102A flushes the content of local file 144 but retains the local file name, e.g., file.txt, for receipt of the repaired data. From FLUSH LOCAL FILE operation 308, processing transitions to a GENERATE OUT-OF-BAND TARGET ACKNOWLEDGMENT operation 310.

In GENERATE OUT-OF-BAND TARGET ACKNOWLEDGEMENT operation 310, the target computer system, e.g., client computer system 102A, generates an out-of-band target acknowledgement. From GENERATE OUT-OF-BAND TARGET ACKNOWLEDGEMENT operation 310, processing transitions to a SEND OUT-OF-BAND TARGET ACKNOWLEDGEMENT operation 312.

In SEND OUT-OF-BAND TARGET ACKNOWLEDGMENT operation 312, the target computer system, e.g., client computer system 102A, sends the out-of-band target acknowledgement over the out-of-band communication channel to trickle and repair application 132 on host computer system 130. Generally viewed, the out-of-band target acknowledgment signals trickle and repair application 132 that the current buffer and local file of client computer system 102A are flushed of the infected data and ready to receive the repaired data. From SEND OUT-OF-BAND TARGET ACKNOWLEDGEMENT operation 312, processing to a RECEIVE REPAIRED DATA operation 314.

In RECEIVE REPAIRED DATA operation 314, the target computer system receives the repaired data from trickle and repair application 132 on host computer system 130. As earlier described, in one embodiment, the repaired data is received on the in-band communication channel over which the infected data was originally trickled in operation 206 (FIG. 2A). In an alternate embodiment, where a connectionless protocol is utilized, such as UDP, and the repaired data amount is small, the repaired data is received on the out-of-band communication channel. From RECEIVE REPAIRED DATA operation 314, processing transitions to a CONTINUE operation 316.

In CONTINUE operation 316, standard communication transmission continues until the transmission is complete or otherwise terminated. From CONTINUE operation 316, processing transitions to an EXIT operation 318 with processing exiting method 300.

The above first embodiment of the invention is described with reference to trickle and repair application 132 implemented at the application level as a trickle and repair terminating security gateway system. In another embodiment of the invention, trickle and repair application 132 is implemented at the transport level as a trickle and repair non-terminating security gateway system. In this next embodiment, trickle and repair application 132 does not serve as a communication endpoint to the sending computer system and the target computer system, Consequently, as described in more detail below with reference to FIGS. 4A and 4B and a method 400, in this next embodiment, trickle and repair application 132 can re-write data packets, and more particularly can encapsulate as data packets the out-of-band target data notification and repaired data for insertion into the communication path, i.e., the data stream, between the sending computer system and the target computer system. The inserted data packets appear to the target computer system to be sent from the sending computer system.

FIGS. 4A and 4B illustrate a flow diagram of a method 400 for trickle and repair of a resource scanned using anti-virus (AV) technologies in accordance with another embodiment of the invention. Referring now to FIGS. 1, 4A and 4B together, in one embodiment, trickle and repair application 132 is implemented on host computer system 130 as a non-terminating security gateway between a sending computer system, represented herein by computer system 128 for purposes of description, and a target computer system, represented herein by client computer system 102A for purposes of description. Thus, in this embodiment, host computer system 130 including trickle and repair application 132 represents a trickle and repair non-terminating security gateway system.

In one embodiment, execution of trickle and repair application 106 by processor 108 results in the operations of method 400 as described below. In one embodiment, method 400 is entered at an ENTER operation 402, and from ENTER operation 402, processing transitions to RECEIVE DATA PACKET(S) operation 404.

In RECEIVE DATA PACKET(S) operation 404, trickle and repair application 132 receives data packet(s) including data of a resource from a sending computer system identified for delivery to a target computer system. For example, in one embodiment, trickle and repair application 132 receives data packets including data, such as a portion of data from a file, e.g., a resource, sent from computer system 128 for delivery to client computer system 102A. From RECEIVE DATA PACKET(S) operation 404, processing transitions to a TRICKLE DATA PACKET(S) operation 406.

In TRICKLE DATA PACKET(S) operation 406, at least a portion of the data packet(s) received in operation 406 is trickled, i.e., communicated, to the target computer system. More particularly, trickle and repair application 132 permits at least a portion of the data packets received in operation 404 to be communicated over an in-band communication channel to client computer system 102A.

Client computer system 102A receives the trickled data packets, extracts the trickled data and passes the trickled data to a receiving application, e.g., application 114, which receives the trickled data into a current buffer, e.g., current buffer 106 (FIG. 1), and establishes a local file, e.g., local file 144 (FIG. 1) identified by a file name, for example, file.txt, into which the trickled data is stored. From TRICKLE DATA PACKET(S) operation 406, processing transitions to an EVALUATE DATA FOR MALICIOUS CODE operation 408.

In EVALUATE DATA FOR MALICIOUS CODE operation 408, data in the data packets is evaluated to determine whether malicious code is detected. More particularly, the data is scanned or otherwise evaluated to determine whether malicious code is detected. As earlier described, AV scan engine 134 can be any one or a combination of a variety of different scanning or evaluation applications or algorithms used for detecting malicious code. The particular method used to obtain the data for scanning and evaluation of the data varies dependent on the particular AV scan engine 134 selected.

For example, in one embodiment, the data is extracted from a copy of the data packets received in operation 404 and evaluated by AV scan engine 134 for the presence of malicious code. From EVALUATE DATA FOR MALICIOUS CODE operation 408, processing transitions to a MALICIOUS CODE DETECTED check operation 410.

In MALICIOUS CODE DETECTED check operation 410, a determination is made whether malicious code is detected in operation 408. For example, in one embodiment, when malicious code is not detected in the data based on operation 408 ("NO"), from MALICIOUS CODE DETECTED check operation 410, processing transitions to a CONTINUE operation 428.

In CONTINUE operation 428, standard communication transmission continues until the transmission is complete or otherwise terminated. From CONTINUE operation 428, processing transitions to an EXIT operation 430 with processing exiting method 400.

Referring back again to MALICIOUS CODE DETECTED check operation 410, alternatively, when malicious content is detected in the data based on operation 408 ("YES"), from MALICIOUS CODE DETECTED check operation 410, processing transitions to a TERMINATE DATA PACKET TRICKLE operation 412.

In TERMINATE DATA PACKET TRICKLE operation 412, the trickle of data packet(s) to the target computer system is terminated. For example, the trickle of data packets from trickle and repair application 132 on host computer system 130 to client computer system 102A is terminated. From TERMINATE DATA PACKET TRICKLE operation 412, processing transitions to a DATA REPAIRABLE check operation 414.

In DATA REPAIRABLE check operation 414, a determination is made whether the data is repairable. More particularly, a determination is made whether the malicious code detected in operation 410 can be removed, or otherwise inactivated, so as not to present a risk to the target computer system. In one embodiment, this check operation is performed as earlier described with reference to operation 210 (FIG. 2A), herein incorporated by reference.

When a determination is made that the data is not repairable, i.e., the malicious code cannot be removed or inactivated ("NO"), from DATA REPAIRABLE check operation 414, processing transitions to EXIT operation 430 with processing exiting method 400. In some embodiments, optionally, prior to the transmission terminating, a notification is generated alerting a user of the target computer system that malicious code is detected.

Referring back again to DATA REPAIRABLE check operation 414, alternatively, when a determination is made that the data is repairable, i.e., the malicious code can be removed or otherwise inactivated ("YES"), from DATA REPAIRABLE check operation 414, processing transitions to a GENERATE REPAIRED DATA operation 416.

In GENERATE REPAIRED DATA operation 416, the data received in operation 404 is repaired so that the malicious code detected in operation 408 is removed from the data, or otherwise inactivated, so as not to present a risk to the target computer system, e.g., client computer system 102A. The resultant modified data is termed herein repaired data. From GENERATE REPAIRED DATA operation 416, processing transitions to a GENERATE OUT-OF-BAND TARGET DATA NOTIFICATION DATA PACKET operation 418.

In GENERATE OUT-OF-BAND TARGET DATA NOTIFICATION DATA PACKET operation 418, trickle and repair application 132 generates an out-of-band target data notification and encapsulates the out-of-band target data notification for insertion into the data stream and sending to the target computer system. In one embodiment, the out-of-band target data notification is generated as earlier described with reference to operation 218 (FIG. 2B), hereby incorporated by reference. Additionally, trickle and repair application 132 encapsulates the out-of-band target data notification into a data packet, herein termed an out-of-band target data notification data packet, to be inserted into the data stream being sent from computer system 128 to client computer system 102A. Encapsulation of a data as a data packet is well known to those of skill in the art and not further described herein in detail to avoid detracting from the principles of the invention.

In one embodiment, the out-of-band target data notification signals client computer system 102A to flush the associated current buffer and to flush the associated local file. From GENERATE OUT-OF-BAND TARGET DATA NOTIFICATION DATA PACKET operation 418, processing transitions to a SEND OUT-OF-BAND TARGET DATA NOTIFICATION DATA PACKET operation 420.

In SEND OUT-OF-BAND TARGET DATA NOTIFICATION DATA PACKET operation 420, the out-of-band target data notification data packet generated in operation 418, is sent to the target computer system. For example, in one embodiment, the out-of-band target data notification data packet is inserted in the data stream sent to client computer system 102A from host computer system 130. More particularly, the out-of-band target data notification data packet is sent to the client computer system 102A over an out-of-band communication channel rather than the in-band communication channel over which the data was originally trickled in operation 406.

Client computer system 102A receives the out-of-band target data notification data packet, extracts the out-of-band target data notification, and passes the out-of-band data notification to the target application, e.g., application 114. In response, client computer system 102A flushes the data in the associated current buffer, e.g., current buffer 106 (FIG. 1) and flushes the data in the associated local file, e.g., local file 144 (FIG. 1). As earlier described, in this way, the data containing the malicious code, i.e., the infected data, is removed from the current buffer and from any local file or memory location holding the infected data.

In one embodiment, the processing of the out-of-band target data notification is performed by client computer system 102A as earlier described with reference to FIG. 3 and method 300. Thus, although this embodiment is implemented at the transport level, the out-of-band target data notification appears the same to the receiving application, e.g., application 114, on client computer system 102A.

When complete, client system 102A, e.g., application 114 on client system 102A, generates and sends an out-of-band target acknowledgment which is sent as a data packet, herein termed an out-of-band target acknowledgement data packet, from client computer system 102A on an out-of-band channel to host computer system 130. From SEND OUT-OF-BAND TARGET DATA NOTIFICATION DATA PACKET operation 420, processing transitions to a RECEIVE OUT-OF-BAND TARGET ACKNOWLEDGMENT DATA PACKET operation 422 upon receipt of an out-of-band target acknowledgment data packet from the target computer system.

In RECEIVE OUT-OF-BAND TARGET ACKNOWLEDGEMENT DATA PACKET operation 422, trickle and repair application 132 captures the out-of-band target acknowledgement data packet sent by client system 102A and extracts the out-of-band target acknowledgment. The out-of-band target acknowledgment signals trickle and repair application 132 that the target computer system, e.g., client computer system 102A, is ready to receive the repaired data. From RECEIVE OUT-OF-BAND TARGET ACKNOWLEDGEMENT DATA PACKET operation 422, processing transitions to a GENERATE REPAIRED DATA PACKET(S) operation 424.

In GENERATE REPAIRED DATA PACKET(S) operation 424, the repaired data generated in operation 416 is encapsulated as data packet(s) for insertion into the communication path, e.g., the data stream, between the sending computer system, e.g., computer system 128, and the target computer system, e.g., client computer system 102A. From GENERATE REPAIRED DATA PACKET(S) operation 424, processing transitions to a SEND REPAIRED DATA PACKET(S) operation 426.

In SEND REPAIRED DATA PACKET(S) operation 426, the repaired data packet(s) including the repaired data generated in operation 416, are sent to client computer system 102A. In one embodiment, the repaired data packets are sent to client system 102A on the in-band communication channel over which the infected data was initially trickled in operation 406. This embodiment can be utilized with both connection-oriented protocols, such as TCP, and connectionless protocols, such as UDP. In some embodiments, the entire file including the repaired data, herein termed the repaired file, is sent. In some embodiments, in which protocols that support file location, such as the Common Internet File System (CIFS) protocol, the Hypertext Transfer Protocol (HTTP) and the Network File System (NFS) protocol, are used, a portion of the file including the repaired data, is sent using the facilities available within the particular protocol that allow the identification of the portion to be repaired.

As an alternative to sending the repaired data as an in-band communication, in some instances the repaired data is sent as an out-of-band communication. For example, in one alternate embodiment, where a connectionless protocol, such as UDP, is being utilized for communication and the repaired data is contained in a single packet, the repaired data is sent as out-of-band data over the out-of-band communication channel to client computer system 102A. In another alternate embodiment, where a high-level application protocol, such as a data streaming protocol, which guarantees data delivery and ordering, or other methods available within the protocol to handle lost packets, the repaired data is sent as out-of-band data over the out-of-band communication channel to client computer system 102A. From SEND REPAIRED DATA PACKET(S) operation 426, processing transitions to CONTINUE operation 428, earlier described, with processing exiting method 200 at EXIT operation 430.

In some embodiments, optionally, method 200 and method 400 can also provide the sending computer system, e.g., computer system 128, the repaired data. For example, in one embodiment, with reference to method 200, trickle and repair application 132 generates and sends an out-of-band sender data notification over an out-of-band communication channel, herein termed a second out-of-band communication channel, to the sending computer system, e.g., computer system 128.

In one embodiment, the out-of-band sender data notification signals the sending computer system that malicious code is detected in the sent data and that repaired data is to be sent. On receipt of an acknowledgment from the sending computer system, e.g., an out-of-band sender acknowledgment, trickle and repair application 132 sends the repaired data to the sending computer system over the in-band communication channel used to communicate the infected data from the sending computer system, herein termed a second in-band communication channel. Optionally, where a connectionless communication protocol, such as UDP, is utilized and the repaired data amount is small, the repaired data can instead be sent to the sending computer system over the second out-of-band communication channel, rather than the second in-band communication channel.

As another example, in another embodiment, with reference method 400, trickle and repair application 132 generates and sends an out-of-band sender data notification data packet including the earlier described out-of-band sender data notification over the an out-of-band communication channel to the sending computer system.

In one embodiment, the out-of-band sender data notification is extracted by the sending computer system. On receipt of an acknowledgment from the sending computer system, e.g., an out-of-band sender acknowledgment, trickle and repair application 132 encapsulates the repaired data as repaired data packets and sends the repaired data to the sending computer system over the in-band communication channel used to communicate the infected data from the sending computer system. Optionally, where a connectionless communication protocol, such as UDP, is utilized and the repaired data amount is small, the repaired data can instead be sent to the sending computer system over an out-of-band communication channel rather than the in-band communication channel.

The above described embodiments can be implemented in various ways, for example, in one embodiment, a trickle and repair terminating security gateway system can utilize the out-of-band flag, e.g., MSB_OOB flag and/or a keyword to indicate the transition from the trickled data to the repaired data. As another example, a trickle and repair non-terminating security gateway system can set the URG code bit and update the urgent pointer in the TCP header to identify the key word for the transition, as well as create the correct data packet in which to send the repaired data.

In still further embodiments, the window size is used as a system specific way to handle the trickle size. For example, in one embodiment, the security gateway network stack can be modified to support the ability to automatically control the size of the session data being sent. In one embodiment, the TCP stack can be extended to allow an application proxy to dynamically increase and decrease the TCP window size being used by using an extended BSD call. For example, a new BSD get/set socket option, such as SO_READ_WINDOW_SIZE and SO_WRITE_WINDOW_SIZE, can be utilized.

In non-terminating security gateway implementations, where the network stack may not be a standard size and the data stream may not traverse the TCP layer, the transport layer protocol can be extended to re-write outgoing packets for window size requirements. Further, in some embodiments, the AV scan engine, e.g., AV scan engine 132, can approximate the amount of time an AV scan will take and use this time approximate as an input to an algorithm to determine the window size, such as for the minimum amount of data.

Herein, although trickle and repair application 132 is referred to as a software application, this is illustrative only. Trickle and repair application 132 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Embodiments may be carried out using any suitable hardware configuration or means involving a personal computer, a workstation, a portable device, or a network of computer devices. Network configurations including client-server configurations and network configurations other than client-server configurations, e.g., peer-to-peer, web-based, intranet, Internet network configurations, can be used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, trickle and repair application 132 may be stored in a memory (not shown)

that is physically located in a location different from processor 138. Processor 138 should be coupled to the memory. This could be accomplished in a client-server system, or alternatively via a connection to another computer via modems and analog lines, or digital interfaces and a digital carrier line.

More specifically, in one embodiment, client computer systems 102A-102N and host computer system 130 is a portable computer, a workstation, a two-way pager, a cellular telephone, a digital wireless telephone, a personal digital assistant, a server computer, an Internet appliance, or any other device that includes components that can execute the functionality of trickle and repair application 132 in accordance with at least one of the embodiments as described herein. Similarly, in another embodiment, host computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of trickle and repair application 132 can be implemented in a wide variety of computer system configurations. In addition, the functionality of trickle and repair application 132 could be stored as different modules in memories of different devices.

For example, trickle and repair application 132 could initially be stored in a server computer system (not shown), and then as necessary, a portion of trickle and repair application 132 could be transferred to host computer system 130 and executed on host computer system 130. Consequently, part of the functionality of trickle and repair application 132 would be executed on processor 138 of host computer system 130, and another part would be executed on another processor (not shown) of the server computer system (not shown).

In view of this disclosure, those of skill in the art can implement the various embodiments described herein in a wide-variety of physical hardware configurations using an operating system and computer programming language of interest to the user. This disclosure provides exemplary embodiments. The scope of the various embodiments described herein is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
   receiving data from a sending computer system, said data for delivery to a target computer system;
   trickling at least a portion of said data to said target computer system over an in-band communication channel;
   determining whether said data contains malicious code;
   upon a determination that said data contains malicious code, terminating said trickling;
   determining whether said data is repairable;
   upon a determination that said data is repairable, generating repaired data;
   generating an out-of-band target data notification said out-of-band target data notification causing said target computer system to remove said at least a portion of said data from said target computer system;
   sending said out-of-band target data notification to said target computer system over an out-of-band communication channel;
   receiving an out-of-band target acknowledgment from said target computer system; and
   sending said repaired data to said target computer system.

2. The computer implemented method of claim 1 wherein said determining whether said data contains malicious code comprises scanning said data for said malicious code.

3. The computer implemented method of claim 1 wherein said sending said repaired data to said target computer system is over said in-band communication channel.

4. The computer implemented method of claim 1 wherein said sending said repaired data to said target computer system is over said out-of-band communication channel.

5. The computer implemented method of claim 1 wherein said out-of-band target data notification causes said target computer system to flush an associated current buffer and an associated local file so as to remove said at least a portion of said data from said target computer system.

6. The computer implemented method of claim 1 wherein said computer implemented method is implemented as a trickle and repair terminating security gateway system.

7. The computer implemented method of claim 1 wherein said computer implemented method is implemented as a trickle and repair non-terminating security gateway system.

8. The computer implemented method of claim 7 wherein said out-of-band target data notification is placed in at least one data packet and inserted into said out-of-band communication channel.

9. The computer implemented method of claim 7 wherein said repaired data is placed in one or more data packets and inserted into said in-band communication channel.

10. The computer implemented method of claim 7 wherein said repaired data is placed in one or more data packets and inserted into said out-of-band communication channel.

11. The computer implemented method of claim 1 wherein said data is at least a portion of a file, and further where said repaired data is sent to said target computer system as part of a repaired file.

12. The computer implemented method of claim 1 wherein said data is at least a portion of a file, and further where said repaired data is sent to said target computer system as part of a repaired file portion.

13. The computer implemented method of claim 1 wherein at least said repaired data is sent to said sending computer system.

14. A computer system comprising:
   a memory having stored therein a trickle and repair application; and
   a processor coupled to said memory, wherein execution of said trickle and repair application generates a method comprising:
   receiving data from a sending computer system, said data for delivery to a target computer system;
   trickling at least a portion of said data to said target computer system over an in-band communication channel;
   determining whether said data contains malicious code;
   upon a determination that said data contains malicious code, terminating said trickling;
   determining whether said data is repairable;
   upon a determination that said data is repairable, generating repaired data;
   generating an out-of-band target data notification, said out-of-band target data notification causing said target computer system to remove said at least a portion of said data from said target computer system;
   sending said out-of-band target data notification to said target computer system over an out-of-band communication channel;
   receiving an out-of-band target acknowledgment from said target computer system; and
   sending said repaired data to said target computer system.

15. A computer program product comprising a tangible computer readable medium containing computer program code comprising:
- a trickle and repair application for receiving data from a sending computer system, said data for delivery to a target computer system;
- said trickle and repair application further for trickling at least a portion of said data to said target computer system over an in-band communication channel;
- said trickle and repair application further for determining whether said data contains malicious code;
- upon a determination that said data contains malicious code, said trickle and repair application further for terminating said trickling;
- said trickle and repair application further for determining whether said data is repairable;
- upon a determination that said data is repairable, said trickle and repair application further for generating repaired data;
- said trickle and repair application further for generating an out-of-band target data notification said out-of-band target data notification causing said target computer system to remove said at least a portion of said data from said target computer system;
- said trickle and repair application further for sending said out-of-band target data notification to said target computer system over an out-of-band communication channel;
- said trickle and repair application further for receiving an out-of-band target acknowledgment from said target computer system; and
- said trickle and repair application further for sending said repaired data to said target computer system.

16. The computer program product of claim 15 wherein said sending said repaired data to said target computer system is over said in-band communication channel.

17. The computer program product of claim 15 wherein said sending said repaired data to said target computer system is over said out-of-band communication channel.

18. The computer program product of claim 15 wherein said out-of-band target data notification causes said target computer system to flush an associated current buffer and an associated local file so as to remove said at least a portion of said data from said target computer system.

19. The computer program product of claim 15 wherein said data is at least a portion of a file, and further where said repaired data is sent to said target computer system as part of a repaired file.

20. The computer program product of claim 15 wherein said data is at least a portion of a file, and further where said repaired data is sent to said target computer system as part of a repaired file portion.

* * * * *